United States Patent [19]

Lewis et al.

[11] Patent Number: 4,709,465
[45] Date of Patent: Dec. 1, 1987

[54] INTERCHANGEABLE SPINDLE-HEAD MILLING SYSTEM

[75] Inventors: Henry W. Lewis; Jan Van Roojen, both of Rockford, Ill.

[73] Assignee: The Ingersoll Milling Machine Company, Rockford, Ill.

[21] Appl. No.: 784,723

[22] Filed: Oct. 4, 1985

[51] Int. Cl.$^4$ .......................... B23Q 3/157; B23Q 3/12
[52] U.S. Cl. ...................................... 29/568; 409/144; 409/230
[58] Field of Search ............... 29/568, 26 A; 409/144, 409/230, 231, 232, 233, 234, 241, 211, 216, 215; 408/20

[56] References Cited

U.S. PATENT DOCUMENTS

| 3,757,637 | 9/1973 | Eich et al. | 409/241 |
| 4,365,916 | 12/1982 | Miyakawa | 409/144 |
| 4,370,080 | 1/1983 | Goode | 409/200 |
| 4,551,903 | 11/1985 | Bisrach | 29/568 |

FOREIGN PATENT DOCUMENTS 2711162 10/1977 Fed. Rep. of Germany ...... 409/230
3345414 2/1985 Fed. Rep. of Germany .

OTHER PUBLICATIONS

*The Cutting Edge*, No. 3, 1984, pp. 5–6, published Sept. 14, 1984.

*Primary Examiner*—Z. R. Bilinsky
*Attorney, Agent, or Firm*—Fitch, Even, Tabin & Flannery

[57] ABSTRACT

Disclosed is a machine system adaptable to a wide range of milling conditions and functions by the provision of a master milling head capable of providing spindle-driving power and up to 5-axis movement to a wide range of individual spindle heads each designed for a specific machining function, and each selectively, interchangeably, and automatically matable to the master head.

6 Claims, 10 Drawing Figures

INTERCHANGEABLE SPINDLE-HEAD MILLING SYSTEM

This invention relates to milling machines, and in particular to a milling system in which a master or universal milling head may be coupled selectively and automatically with a variety of individual spindle units for different machining purposes.

Inasmuch as individual milling machines tend to be limited by bearing design criteria to a given, but limited, range of spindle speeds and power, attempts have been made to increase the versatility of such machines by providing attachments which are coupled with the spindle of the milling head by the tool gripper of the spindle, and restrained against rotation in a variety of ways to drive the attachment from the machine spindle. However, the range of versatility contributed in that fashion has been limited, and the set-up requirements a deterrent to the use of such attachments in an automated, "machining center" type of production milling operation.

It is, accordingly, the object of this invention to provide a milling system in which a master milling head is specifically designed to be coupled with a substantial inventory of final-drive spindle units of different purpose which are interchangeably connectible with the common master milling head in much the same sense that specific cutting tools are replaced in a machining center spindle by an automatic tool changer. The master head is designed to provide substantial power at moderate speeds to the input coupling of any of the spindle heads interchangeably coupled therewith, so as to provide greater or lesser final spindle speeds in any spindle orientation that may be required in a flexible machining system.

SUMMARY OF THE INVENTION

The master milling head of the system of the invention consists essentially of a saddle-mounted ram having therein an elongated torque tube terminating in a drumhead at the face of the ram, and rotatable about the longitudinal axis of the ram, so as to feed or position a spindle head attached to the drumhead rotatively about the longitudinal or "C-axis" of the ram. Concentrically positioned within the torque tube and journaled for rotation therein is an elongated spindle driveshaft coupled to a drive motor at the remote end of the ram and having at its opposite end a face flange and bar key for driving engagement with a complementary coupling on the input shaft of the spindle unit.

At the coupling face of the master head, the drumhead is provided with multiple grippers, similar to those now employed as tool grippers in milling head spindles, which are engageable with a like number of complementary gripping knobs secured as studs to the coupling face of the interchangeable spindle head, which is drawn by the grippers into secure facing engagement with the drumhead of the master unit, simultaneously coupling the driveshaft of the master head to the input shaft of the spindle head and marrying the spindle head to the ram.

The drumhead is also provided at its coupling face with fluid and electrical connectors, some or all of which may be coupled with the spindle unit by oriented and complementary connectors therein, and the drumhead further carries an auxiliary servomotor available as the "B-axis" drive of the spindle head where the latter is of the 2-axis type, as, for example, a spindle head having a nutating spindle or a boring unit of the quill or axially-extensible spindle type.

DESCRIPTION OF THE DRAWINGS

The invention is explained in detail by reference to a preferred embodiment illustrated in the accompanying drawings, of which:

FIGS. 3.1, 3.2 and 3.3 are segments of a cross-sectional view of the ram which constitutes the master milling head of the system;

DETAILED DESCRIPTION OF THE INVENTION

Figures 1, 2:
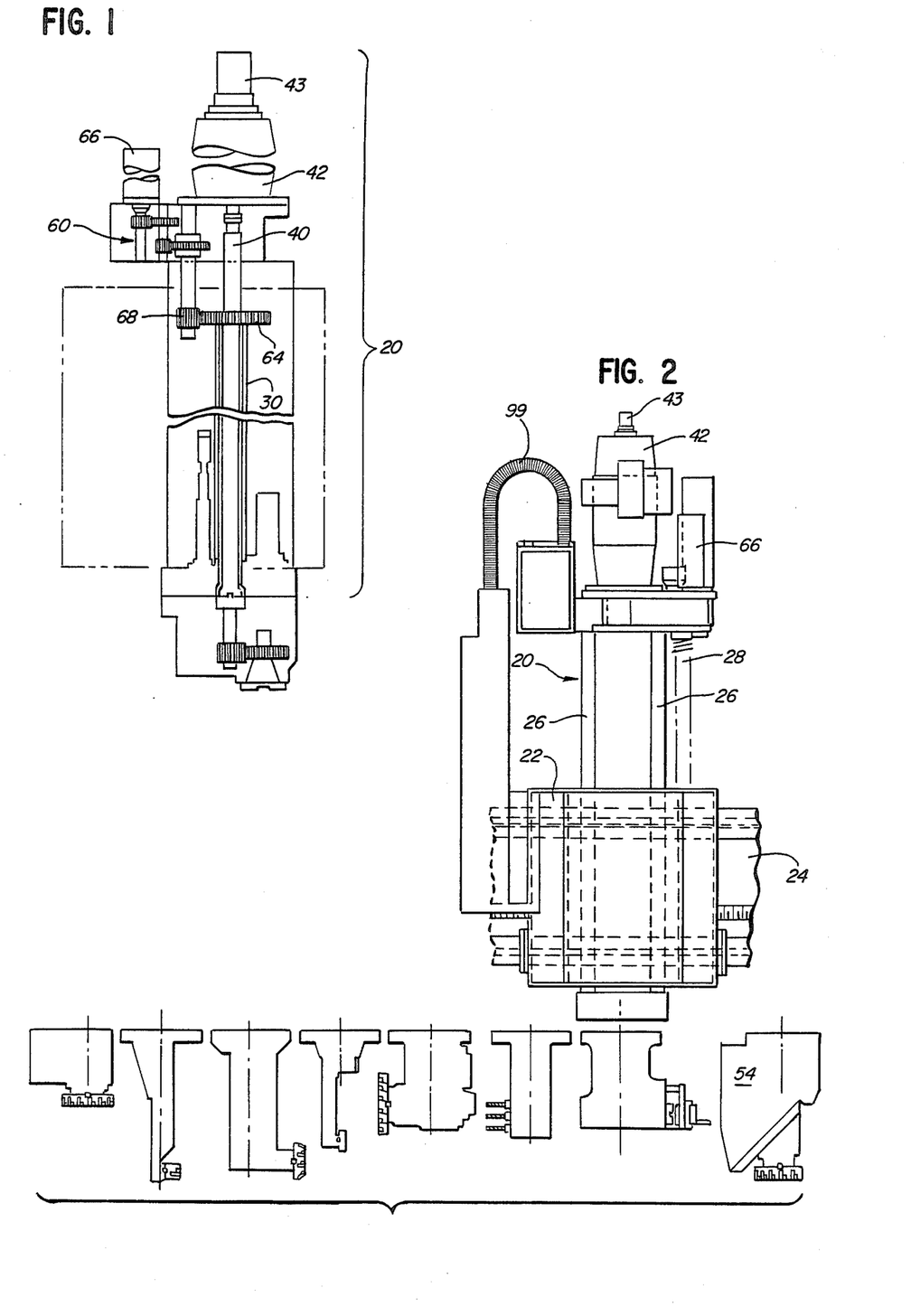
FIG. 1 is a diagrammatical illustration of the master milling system of the invention, showing the master head coupled to a speed-reducing spindle head.
FIG. 2 is an elevational view of the master head mounted for vertical movement in a saddle on the crossrail of a portal or gantry type of milling machine above an array of spindle heads adapted for coupling with the master head.

In the preferred embodiment of the invention, the master head takes the form of a ram 20 which is an elongated, boxlike structure, slideable longitudinally of itself in a saddle 22, vertically if the saddle is mounted on the crossrail 24 of a gantry or portal type of milling machine, and slideable horizontally if mounted in the vertically movable saddle of a column type of milling machine (not shown). However, as certain features of the illustrated embodiment are intended for a vertically positioned ram, it will be convenient to describe the ram as illustrated in FIG. 2, i.e., oriented vertically.

Figure 6:
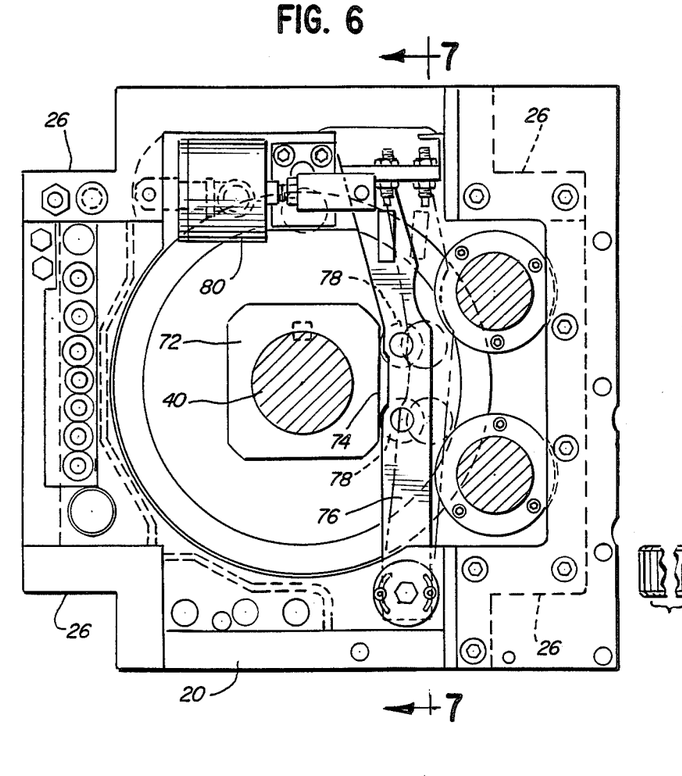
FIG. 6 is a sectional view of the ram taken near its upper end to illustrate the positive lock of the driveshaft for coupling orientation.
Figure 7:
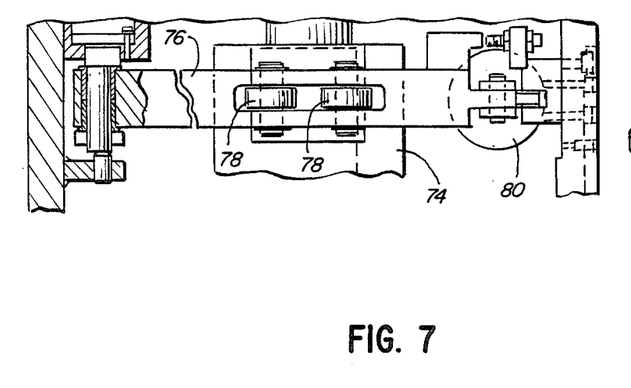
FIG. 7 is a side view of the same locking mechanism.

The cross-sectional corners of the boxlike ram are inverted (see FIGS. 4 and 6) to provide recessed runners 26 for sliding contact with gibbed ways within the saddle, and the ram is moved within the saddle by a ram-mounted servomotor driving a ball screw 28 engaged with a nut hidden in the saddle, and controlled in part by electromagnetically interacting linear position sensors on the ram and on the saddle. As these arrangements, commonly referred to as the "Z-axis" drive, are well understood by those skilled in this art, they are indicated only generally in FIG. 2, and omitted from the remaining drawings for the sake of clearer presentation of the unique features of the invention.

Drive Shaft and C-Axis Mechanism

Figure 31:
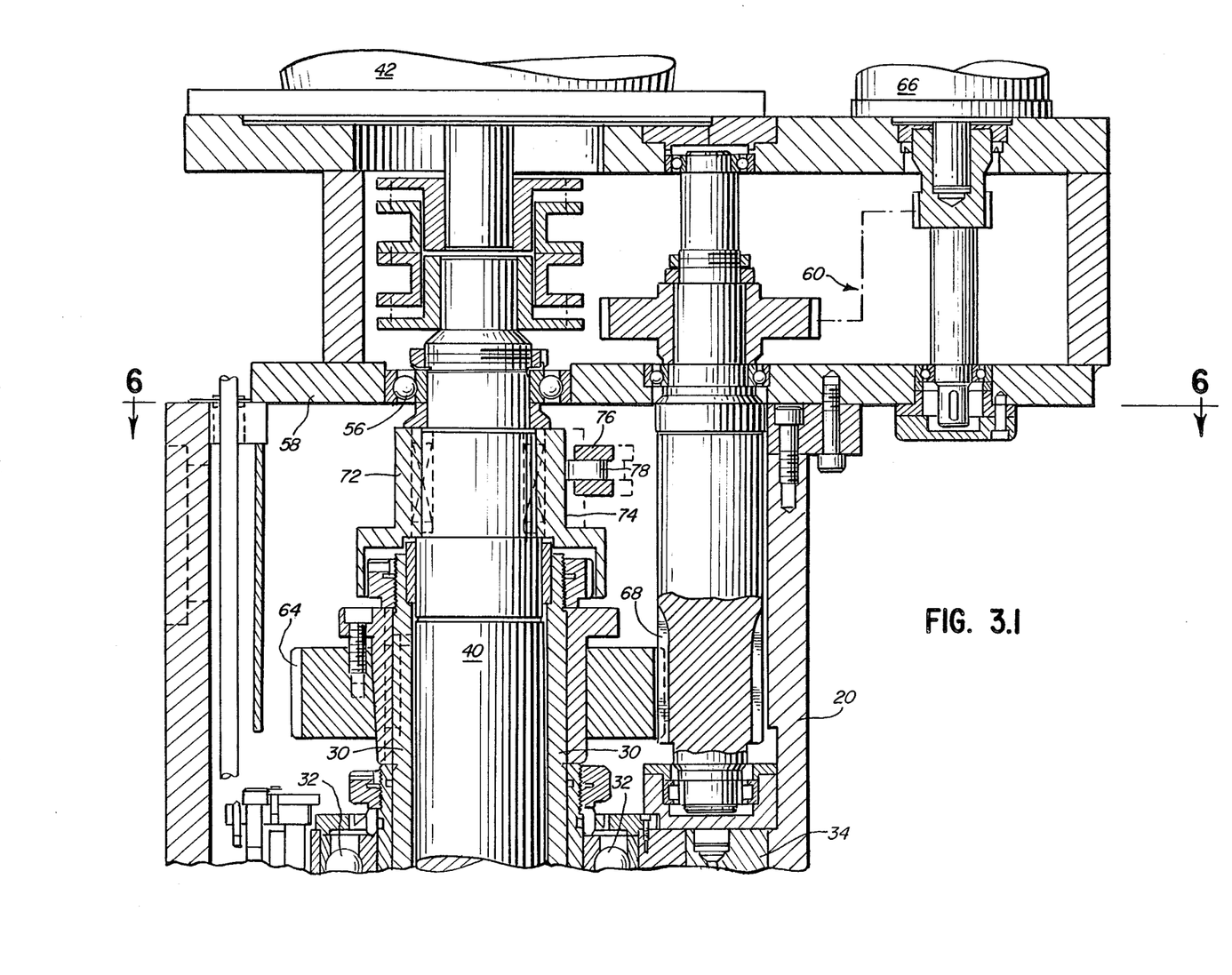
Figure 32:
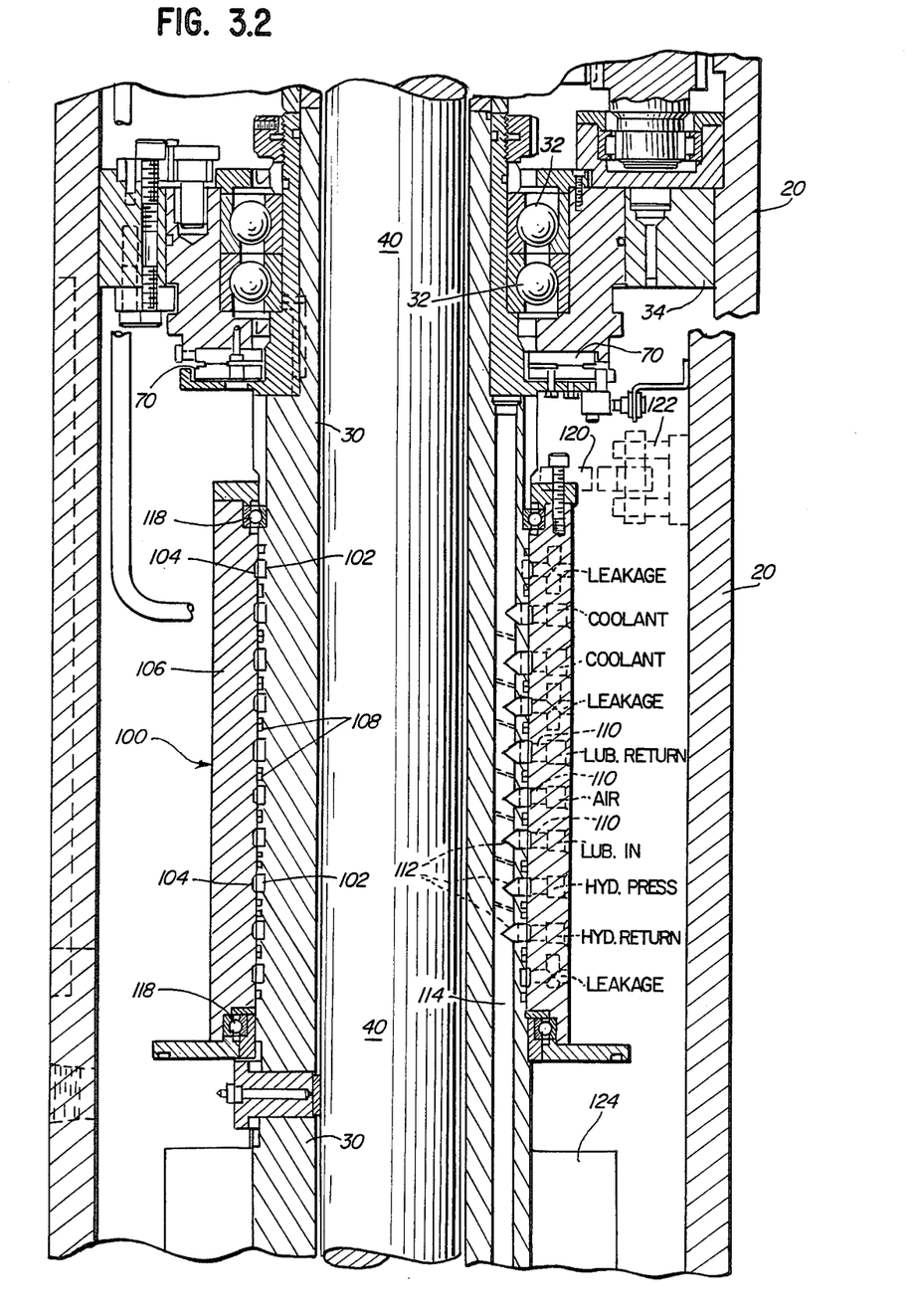
Figure 33:
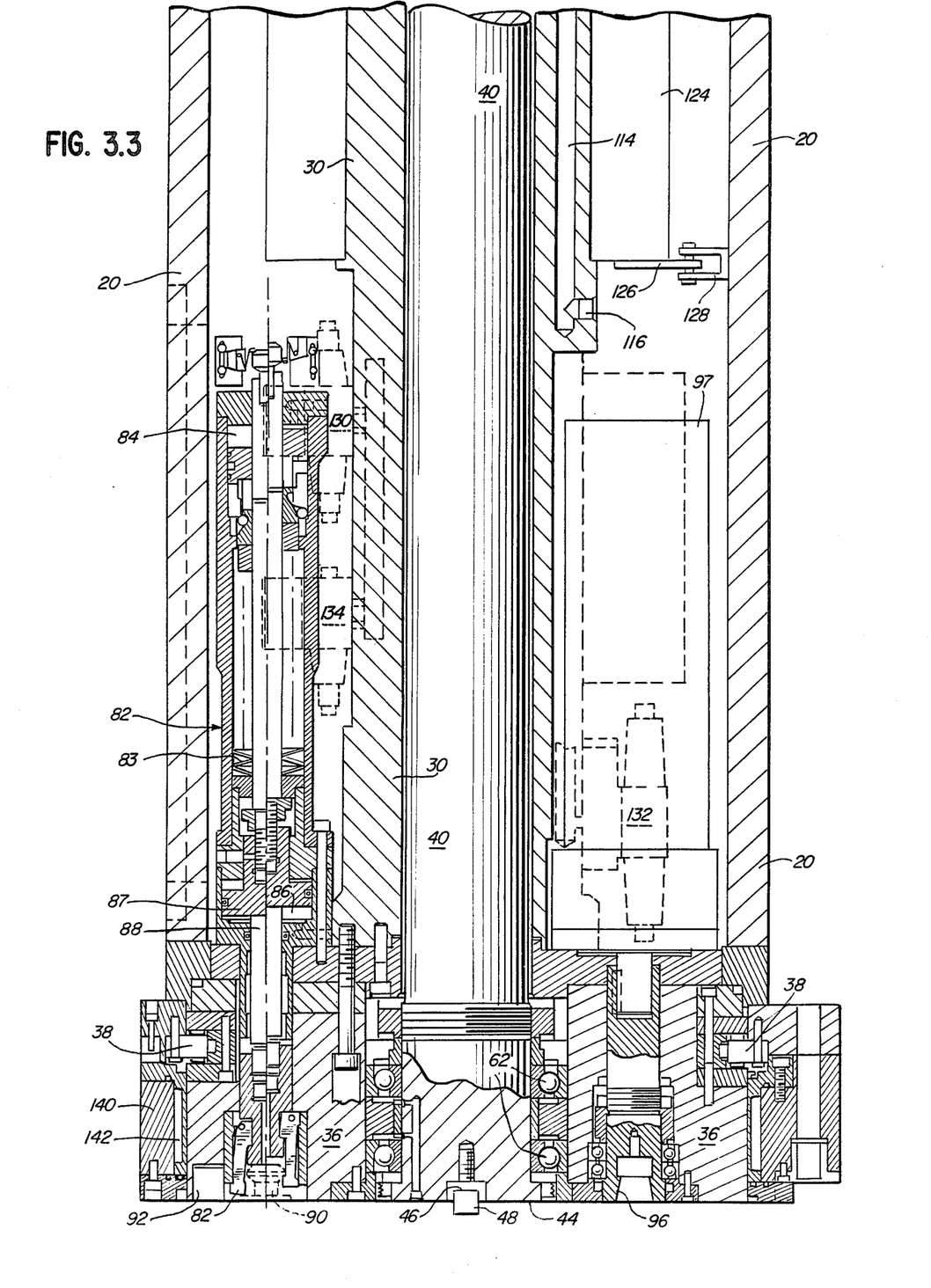

Referring to FIGS. 3.1, 3.2 and 3.3, there is journaled for rotation within the ram and extending longitudinally thereof a drum which comprises a torque tube 30 journaled toward its upper end in ball bearings 32 in a bulkhead 34 in the ram (FIG. 3.1), and having secured thereto at its lower end, as though integral therewith, a drumhead 36 journaled in a bulkhead at the bottom of the ram by means of a combined thrust and radial roller bearing 38 of large diameter (FIG. 3.3).

Figure 4:
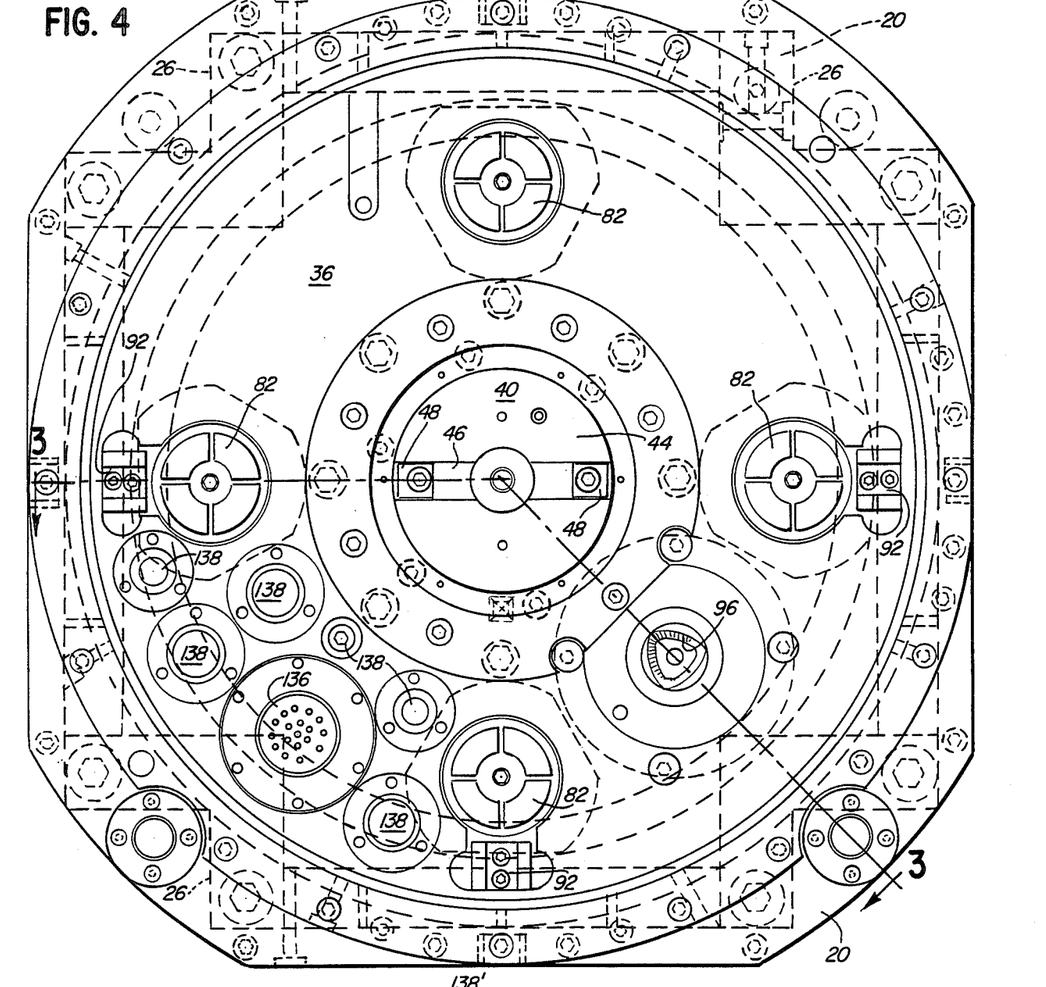
FIG. 4 is a bottom view of the ram, showing the coupling face of the drumhead of the ram.
Figure 5:
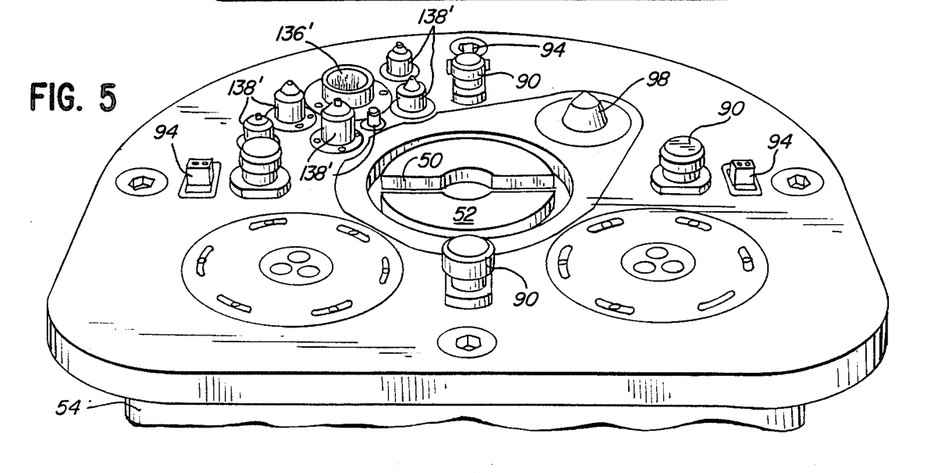
FIG. 5 is a perspective view of the coupling face of a particular spindle head unit designed for coupling with the drumhead of FIG. 4.

Inside the torque tube 30, concentrically therewith, and journaled for rotation with respect thereto, is an elongated driveshaft 40 coupled at its upper end to a drive motor 42, and having at its lower end a flanged face 44 with a diametrical keyway 46 in which are secured near the ends of the groove, a pair of keying blocks 48, each screwed to the shaft 40 and each insertable into a complementary diametrical keyway 50 in the mating face of the input coupling 52 of a detachable spindle unit 54 to be associated with the master milling head (compare FIGS. 4 and 5).

The driveshaft 40 is journaled at its upper end (FIG. 3.1) by a ball bearing 56 in a bulkhead 58 of the ram which also provides bearing support for the C-axis gear trains 60, and is journalled at its lower end (FIG. 3.1) in bearings 62 in the rotary drumhead 36.

The rotative drive of the ram drum, i.e., the C-axis drive 60, includes a sizable ring gear 64 secured to the torque tube 30 at its upper end and driven from a servomotor 66 through a zero-backlash, double gear train, each terminating in a pinion 68 engaged with the ring gear at the top of the torque tube, with each pinion urged to engage opposite tooth flanks of the ring gear 64. As this is accomplished by driving the two trains by a double helical gear of opposite hand which is spring-loaded axially to bias its driven gears in opposite directions, an arrangement well-known to those in this art, the full C-axis gear train is shown only diagrammatically and as a mere single train drive in FIG. 1, and largely omitted in FIG. 3.1. Electromagnetic rotary position sensors 70 on the torque tube and ram, respectively, beneath the upper bearings 32 (FIG. 3.2) provide position feedback for the control of the C-axis drive.

To prevent any mismatch of the key 48 at the bottom of the driveshaft 40 and the complementary key way 50 on the face of the input coupling 52 of the spindle head, the rotation of the driveshaft 40 is stopped dead in a predesignated rotative orientation for coupling by the control circuitry of the drive motor 42, which is provided with a resolver 43 to signal its precise rotative position. However, for firmly locked positioning, there is keyed to the driveshaft, near its upper end below the uppermost inner bulkhead 58, a hub 72 having four flats machined thereon, one of which, 74, cooperates with a positive mechanical locking device for locking the driveshaft in coupling position. A lever 76, having spaced contact rollers 78 engageable with the aforementioned flat 74 on the driveshaft hub, is moved into locking position by a double-acting air cylinder 80 which, when oppositely energized, retracts the rollers 78 from the rotational path of the hub.

While for the indicated function, only a single flat 74 obviously is used, the opposite flat disposed at 180 degrees from the operative flat 74 is machined on the hub for the sake of dynamic balance, while the orthogonally oriented pair of non-functional flats is provided simply to avoid position error in cutting the keyway in the hub.

Examining the drumhead 36 from the bottom of the ram (FIG. 4), one sees four collet-like grippers 82, equally spaced in satellite fashion around the common rotational axis of the drumhead 36 and driveshaft 40. Each of these is an Ott gripper commonly used as the spindle-housed tool gripper of automated, tool-changing milling machine spindles, modified only slightly for this service in that, whereas the Ott gripper is held normally closed by the combined force of a stack 83 of Belleville washers, and is opened against that closing force by a counteracting hydraulic cylinder 84, the holding power of the spring stack of the Ott gripper is preferably reinforced hydraulically by a second cylinder 86 whose piston 87 encircles and incorporates the operating rod 88 of the gripper.

Each of the four grippers 82 is adapted to mate with a correspondingly positioned complementary retention knob 90 formed on a stud which is screwed into, and thus protrudes from, the mating face of the spindle head unit 54 to which the master head is coupled (FIG. 5). For the precise positioning of the spindle head 54 with the drumhead 36 of the ram, there are additionally provided in the coupling face of the drumhead, in association with three of the four spindle grippers, a positioning interlock in the form of a receptacle or socket 92 of generally rectangular shape which receives the complementary one of three mating keying blocks 94 equally precisely positioned on the mating face of the spindle unit.

Thus, when the spindle unit 54 and ram 20 are presented to one another in reasonably accurate axial and rotative alignment, as suggested diagrammatically in FIG. 2, their movement into union with each other by linear movement of the ram on the Z-axis positions the coupled units precisely in the rotative sense, and the grippers 82, when closed upon the retention knobs 90 of the spindle unit, firmly hold the two units together in facing engagement, with the driveshaft 40 of the master head keyed in driving relation to the input coupling 52 of the spindle head.

B-Axis Drive

Referring still to the coupling face of the drumhead 36, there is carried by the drumhead, positioned midway between the grippers 82 positioned at 3 o'clock and at 6 o'clock in clockface terms (FIG. 4), the 3-lobed socket 96 of a polygonal coupling of the B-axis drive.

The drive itself, referring to FIG. 3.3, comprises a servomotor 97 positioned axially parallel to the axis of the ram and mounted on the upper or back face of the drumhead 36. It is a direct-drive servomotor with controls connectible to appropriate feedback position sensors in the spindle head, and is keyed to the B-axis coupling socket member 96 journaled coaxially with the motor shaft in roller bearings in the drumhead.

The auxiliary B-axis drive is utilized for those spindle heads designed for a second axis of movement, such as a nutating spindle head, for example, disclosed in U.S. Pat. No. 4,370,080, issued to the assignee of this invention, whose mating face, FIG. 5, is provided with the accurately positioned complementary polygonal coupling part 98.

While not readily apparent in the frontal view of the coupling face of the drumhead in FIG. 4, it will be seen from the cross-sectional view of the ram in FIG. 3.3 that the socket member 96 of the coupling is tapered to receive the complementarily tapered and insertable coupling part 98 carried by the spindle head. The polygonal form and the tapered mating of the two coupling parts effect the automatic correction of any minor rotative misalignment of the two coupling members to preserve the integrity of operation of the servo system for the B-axis, which contributes equally with the C-axis drive to the accurate placement of a tool held in such a spindle.

Electrical, Hydraulic, and Air Supply Auxiliaries

In addition to the coupling of the spindle head to the drumhead for C-axis control of the spindle head, the connection of the master driveshaft with the spindle head input coupling, and the coupling of the spindle head to the master head on the B-axis where the spindle head has that provision, there are also provided suitable electrical, hydraulic, and air supply auxiliaries for the operation of the spindle head. These auxiliaries enter the ram from above through an armored flexible conduit 99 (FIG. 2) and then enter the torque tube 30 through electrical and fluid connections beginning beneath and adjacent to its upper bearings 32.

Closest to the bearings 32 is a rotary union 100 for the fluid connections (FIG. 3.2). The union comprises a series of reasonably closely spaced peripheral grooves 102 turned in the outer surface of the torque tube 30, and a series of complementary inner circumferential grooves 104 bored in the inner surface of a surrounding sleeve 106 which constitutes the stationary member of the union. Flanking each of the peripheral grooves 102 in the outer surface of the torque tube is a pair of circumferential cup seals 108 which bear against the inner surface of the fixed sleeve 106 as well as against the bottoms of their respective host grooves in the torque tube 30 to isolate each fluid channel from the next.

Fluid communication through the stationary outer sleeve of the union is provided by radial taps 110 communicating with each groove 104 of the sleeve 106, while communication within the torque tube 30 is provided by radial taps 112 connecting the grooves 102 in the wall of the torque tube with multiple individual passages 114 gundrilled lengthwise through the wall of the torque tube, from which each subsequently emerges through another radial tap 116 for connection with suitable conduits on the outside of the torque tube which carry the fluid down to connectors in the face of the drumhead 36.

As indicated by labels in FIG. 3.2, two channels of the union are provided respectively for coolant to the spindle and for application to the cutting tool exteriorly, whereas five of the remaining channels of the union are utilized for the hydraulic operation of the grippers, including a pressure line and a return, for the provision of circulating lubricating oil and its return, and for the delivery of pressure air to the face of the drumhead. The latter is used to blow off the approaching faces of the drumhead 36 and spindle head 54 as they are brought into mating contact with each other, as well as for blowing off a tool in the spindle head.

The two end channels of the union 100, and the channel which separates the two coolant channels from the lubricating oil and air channels, are leakage channels for the collection of any fluid material which might otherwise escape the rotary union by axial migration, and to prevent the contamination of the lubricating oil which might otherwise occur.

As the frictional load exerted by the inter-channel seals 108 is cumulative and substantial, the outer sleeve 106 of the union is journaled in roller bearings 118 on the outer wall of the torque tube 30 and is maintained against rotation by an stout arm 120 at its upper end engaged with the pin of a clevis 122 secured to the inner sidewall of the ram.

On the torque tube 30 beneath the rotary union 100 is an electrical brush box assembly 124, housing one or more brushes for each of the multiple slip rings in conventional manner for such devices, the brush box assembly being similarly held against rotation by an arm 126 held by a clevis 128 secured to the inside wall of the ram (FIG. 3.3).

Between the brush box assembly 124 and the drumhead 36 are the previously mentioned grippers 82 and B-axis drive motor 97, and also the solenoid-operated air and hydraulic valves 130, 132 and 134 for the operation of the four grippers in the master head, the earlier mentioned supply of pressure air for blowing off the approaching faces of the drumhead and spindle head, and for the hydraulic operation of the tool gripper or grippers in the spindle or spindles of the spindle head itself. The brush box assembly, of course, is a component of the power and control circuitry to the B-axis servomotor and to the solenoid-operated air and hydraulic valves.

Figure 8:
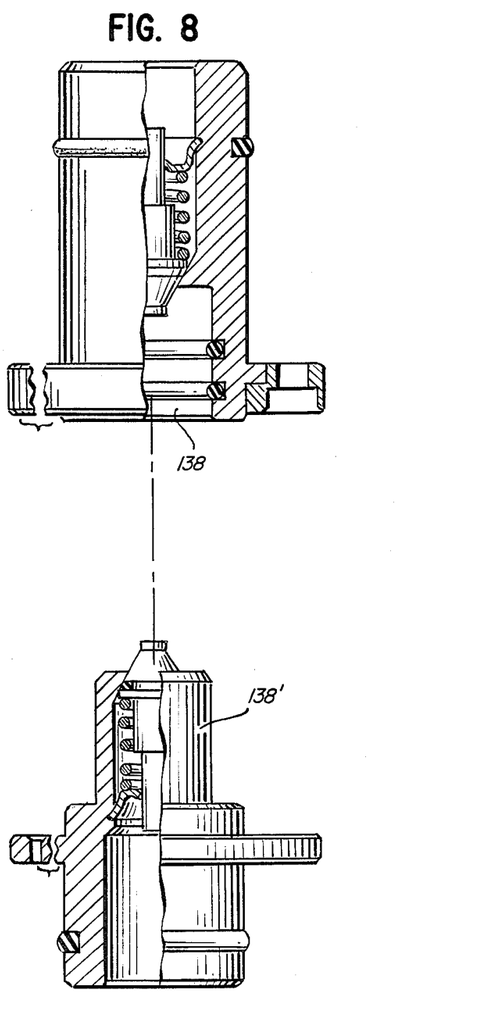
FIG. 8 is an elevational view, partly sectioned, of the fluid connectors at the coupling faces of the ram and spindle unit.

The electrical and fluid connections to the spindle head are of a self-coupling nature and, referring to the face view of the drumhead in FIG. 4, are grouped conveniently together between the master head grippers 82 positioned respectively at 6 o'clock and 9 o'clock in the ram face. The electrical connector 136 is a multiple-pin connector which carries sensing circuitry into the spindle head, whereas the fluid connections 138 to the spindle head, all made through Hansen self-closing connectors, separately illustrated in FIG. 8, include high pressure hydraulic and return connections to operate the single-acting hydraulic cylinder of the tool gripper in the spindle, a lubrication supply and return for the continuous lubrication of the gear drive in the spindle, and two hydraulic connectors for conveying coolant to the cutting tool through the spindle as well as externally for bathing the cutters in operation.

Connecting Face of Spindle Unit

The mating face of the most complete spindle unit 54 is shown in perspective in FIG. 5, being that of the previously mentioned nutating spindle head which, in addition to utilizing the C-axis rotation of the ram drum itself, also utilizes the available B-axis drive for the second degree of rotation of the spindle.

FIG. 5 is presented in perspective, as though the mating face of the spindle head 54 had been rotated downwardly from engagement with the drumhead 36 as seen in FIG. 4, the mating face of the spindle head being the mirror image of that of the drumhead.

Prominently upstanding from the face of the spindle head are the four stud-mounted retention knobs 90, distributed equi-angularly about the input coupling 52 of the spindle head 54, the keyway 50 of the latter being aligned before engagement with the bar key 48 at the coupling face of the ram driveshaft 40. Disposed angularly midway between the far retention knob and the righthand retention knob, as displayed in FIG. 5, is the polygonal coupling member 98 of the B-axis drive, whereas clustered between the far retention knob and the lefthand retention knob are the electrical connector 136' and the fluid connectors 138' associated with the spindle head. Radially outwardly of the left- and righthand retention knobs are the locator blocks 94 which mate with the receiving sockets 92 in the face of the drumhead for precise axial alignment of all of the spindle head connectors with those of the drumhead of the ram.

In that connection, it will be observed that, with the exception of the bar key 48 which couples the driveshaft 40 of the ram with the input coupling 52 of the spindle head, all of the protruding and insertable members of each coupling to be made at the interface of ram and spindle unit are located on the spindle head 54, and all of the socket or receiving members of each coupling pair are carried by the drumhead 36 of the ram. The reason for this orientation, of course, is that not all of the services available from the ram are utilized by every spindle head with which the ram is coupled, the illustration of FIG. 5 showing the coupling face of the nutating spindle head, chosen for illustration because it utilizes each and every one of the services available.

Operation

Where the ram 20 is positioned vertically, as in a portal or gantry machine, the magazine of spindle heads is addressed by the master head by combined movement on the X, Y, and Z axes of the machine to position the master head above and in axial alignment with the upwardly-directed coupling face of the selected spindle head (FIG. 2). As earlier indicated, the drumhead of the ram is brought down into mating contact with the coupling face of the spindle head by Z-axis movement of the ram. In coupling as in uncoupling, the driveshaft 40 of the master head is positioned and locked, provision being preferably made in the spindle head also to assure that its spindle is locked and remains locked in recoupling position for future use.

In addition, the drumhead 36 itself is preferably locked, not only for the sake of coupling and uncoupling, but also for the sake of resisting cutting loads which are transmitted back as torque from the spindle head to the drumhead, and would otherwise back-load the C-axis drive. For that purpose( FIG. 3.3), a brake is provided by a hollow sleeve 140 having a thin wall surrounding the clearance space about the drumhead 36 at the bottom of the ram, the sleeve having a circumferential inner channel 142 which, when pressurized with hydraulic fluid, shrinks the inner wall of the sleeve into seizing contact with the outer periphery of the drumhead to lock the same in place. The fluid connections to the brake are made in any convenient way through the ram, and, having no physical connection with nor passing through the torque tube 30, are not shown.

A successful version of a milling master head of the kind here illustrated and described was provided with a variable speed, direct current, drive motor rated 125 horsepower at 1150 rpm, transmitting that power through the elongated driveshaft 40 measuring 125 millimeters in diameter through most of its length. The resulting drive, with the ram fully extended from the saddle, is very rigid, even when coupled to a speed-reduction spindle unit for heavy duty, high-torque cutting at low-speed.

The master head is substantially independent of the bearing design limitations applicable to and dealt with individually in the spindle heads proper, according to whether the spindle head is designed for high speed and light loads or vice versa, thus providing a milling head adaptable to the requirements of flexible machining, and which is capable of automatically exchanging spindle heads with nearly the same facility that a spindle head changes tools in automated, numerically controlled milling machines of the so-called "machining center" type.

The features of the invention believed patentable are set forth in the following claims.

We claim:

1. In a milling machine having multiple axes of linear and rotational relative movement,
    a master milling head and a tool-spindle unit detachably connected to the master head,
    said master head comprising an elongated ram adapted to be mounted in a machine saddle having two axes of orthogonal relative linear movement,
    said ram being linearly movable in the saddle axially of the ram and perpendicularly to the plane of said two axes,
    a drum journaled for rotation in the ram on the longitudinal axis of the ram and having at one end thereof a drumhead with a coupling face connected to the coupling face of said tool-spindle unit,
    a driveshaft journaled in said drum coaxially thereof and coupled to a drive motor remote from the coupling face of the drumhead,
    said driveshaft having coupling means at the coupling face of the drumhead for coupling the driveshaft to the tool-spindle unit,
    input coupling means on the tool-spindle unit complementary to and drivingly engaged with the coupling means of said driveshaft,
    a plurality of releasable grippers disposed about the coupling face of the drumhead,
    a plurality of complementary gripper-engageable retention knobs at the coupling face of the tool spindle unit secured in the grasp of said grippers, and
    a positioning motor mounted on said ram and connected to rotate said drumhead and detachably connected tool-spindle unit.

2. The arrangement of claim 1 wherein
    a positioning motor is mounted on the drum and connected to rotate a coupling member at the coupling face of the drumhead on an axis parallel to the axis of said driveshaft, and
    the tool-spindle unit has a coupling member complementary to that of said drum-mounted positioning motor for powering the fifth-axis drive of the tool-spindle unit.

3. The arrangement of claim 2 wherein
    the tool-spindle unit includes a hydraulically operated tool gripper within the spindle thereof, multiple fluid passages to conduct hydraulic fluid to the tool gripper, coolant to a cutting tool mounted in the spindle, and lubricant to the moving parts of the spindle unit, an electrically-operated hydraulic valve for operating the tool gripper, and electrical sensors to ascertain the operating condition of the unit,
    self-coupling electrical and fluid connectors carried respectively by the drumhead and the tool-spindle unit span the interface between said drumhead and said tool-spindle unit to serve the electrical and fluid circuitry in said unit,
    said drumhead grippers are operated hydraulically through electrically operated valves carried by said drum,
    rotatable-union fluid connections between said ram and said drum carry fluid to the operating cylinders of said drumhead grippers and to the self-coupling connectors at the interface of the drumhead and tool-spindle unit, and
    slip-ring-and-brush electrical connections between said ram and said drum form part of the power and control circuitry to said drumhead gripper valves, to said fifth-axis positioning motor, and to said tool-spindle unit coupled to the drumhead.

4. A master power unit adapted to be coupled interchangeably in driving relation to a plurality of tool-spindle units to enable a milling machine to perform a variety of machining operations with multiple axes of movement and over a wide range of cutting speeds, said power unit comprising an elongated ram adapted to be mounted in a housing for movement therein axially of the ram, a drum journaled for rotation within the ram and having at one end thereof a drumhead with coupling face connectible to the coupling face of a tool-spindle unit, a driveshaft journaled in said drum coaxially thereof and adapted to be coupled to a drive motor at the end of the ram remote from the coupling face of the drumhead, said driveshaft having means at the coupling face of the drumhead for coupling the driveshaft to the input coupling of a tool-spindle unit, a plurality of electrically-controlled hydraulically-operated grippers positioned at the coupling face of the drumhead for receiving and holding the gripper posts of a tool-spindle unit, self-coupling electrical and fluid connectors at the coupling face of the drumhead positioned to couple with electrical and fluid connectors at the coupling face of a tool-spindle unit to serve an electricaly-controlled hydraulically-operated tool gripper in the spindle of the tool-spindle unit, being coolant to a cutting tool in the spindle thereof, and to serve electrical condition-sensors in the tool-spindle unit, a positioning servomotor mounted on said ram and connected to rotate said drumhead to position the same, a second positioning servomotor carried by said drum and having its output shaft connected to drive a coupling member at the coupling face of the drumhead for connection to the fifth-axis drive of a tool-spindle unit, rotatable-union hydraulic connections between said ram and said drum to carry fluid to the operating cylinders of said grippers and to said self-coupling connectors at the coupling face of the drum, and slip-ring-and-brush electrical connections between said ram and said drum forming part of the power and control circutiry to said drumhead grippers, to said fifth-axis positioning motor, and to a tool-spindle unit coupled to the drumhead.

5. The arrangement of claim 1 wherein the coupling faces of the drum head and tool-spindle unit are respectively provided with a plurality of mating locator protrusions and receiving sockets therefor arrayed asymmetrically about said coupling faces to assure coaxial coupling of the drumhead and spindle unit in but a single rotative orientation.

6. The masterhead of claim 4 wherein the drumhead is further provided with locator receiving sockets in its coupling face to receive mating locator protrusions on the coupling face of a tool-spindle unit, and said sockets are arrayed asymmetrically about said coupling face to assure the coaxial coupling of the drumhead to a tool-spindle unit in but a single rotative orientation.

* * * * *

UNITED STATES PATENT AND TRADEMARK OFFICE
CERTIFICATE OF CORRECTION

PATENT NO. : 4,709,465

DATED : December 1, 1987

INVENTOR(S) : Lewis et al.

It is certified that error appears in the above-identified patent and that said Letters Patent is hereby corrected as shown below:

IN THE REFERENCES CITED

In U.S. cited reference Patent No. 4,551,903, change "Bisrach" to --Bisiach--.

IN THE CLAIMS

Column 9, line 31, change "electricaly" to --electrically--.

Column 9, line 33, change "being" to --bring--.

Column 10, line 17, change "circutiry" to --circuitry--.

Signed and Sealed this

Twenty-fourth Day of May, 1988

Attest:

DONALD J. QUIGG

*Attesting Officer*  *Commissioner of Patents and Trademarks*

Disclaimer

4,709,465.—*Henry W. Lewis; Jan Vam Roojen*, both of Rockford, Ill. INTERCHANGEABLE SPINDLE-HEAD MILLING SYSTEM. Patent dated Dec. 1, 1987. Disclaimer filed May 31, 1990, by the assignee, The Ingersoll Milling Machine Company.

Hereby enters this disclaimer to all claims of said patent.
[ *Official Gazette August 14, 1990* ]